May 25, 1926.

D. F. SIKORSKI

POTATO BUG EXTERMINATOR

Filed Feb. 26, 1926

1,586,123

Inventor
D. F. Sikorski,

By Clarence A. O'Brien
Attorney

Patented May 25, 1926.

1,586,123

UNITED STATES PATENT OFFICE.

DOMINIC F. SIKORSKI, OF BRONSON, MICHIGAN.

POTATO-BUG EXTERMINATOR.

Application filed February 26, 1926. Serial No. 90,847.

This invention relates to a means for exterminating potato bugs, and has for its primary object to provide a machine that may be advantageously drawn between two rows of potato plants and effectively suck the bugs therefrom and then discharge the same between the rows after they have become exterminated by mechanism comprising the essential feature of the present invention.

A further object is to provide a machine of this character that is of relatively simple construction, and that will effectively draw the bugs from the potato plants, and kill the same by causing the bugs to strike with great force against ribs formed or provided within discharge pipes and also by the action of exhaust gases from a combustion engine which in turn is provided to actuate suction fans to cause the withdrawal of the bugs from the plants.

Other objects will become apparent as the nature of the invention will be better understood, the same comprising the novel form, combination, and arrangement of parts hereinafter more fully described, shown in the accompanying drawing and claimed.

In the drawing wherein like reference characters indicate corresponding parts throughout the several views.

Figure 2:
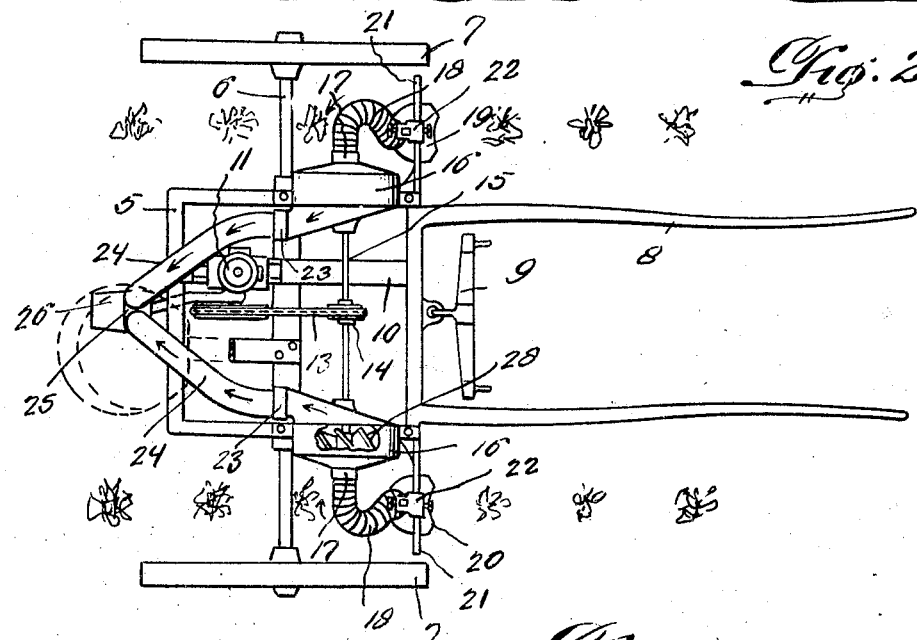
Figure 2 is a top plan view thereof.

Now having particular reference to the drawing, my novel device constitutes the provision of a suitably designed frame 5, extending beneath which is a wheel axle 6 upon the opposite ends of which are wheels 7—7, the length of this axle being such as to project beyond two rows of potato plants as clearly shown in Figure 2, the frame being disposed between the rows during the operation of the machine for the purpose intended.

At the forward end of the frame 5 are conventional draft animal shafts 8 at the inner end of which is a conventional single tree 9 in order that an animal may be harnessed to the machine for pulling the same, it being of course understood that other means may be provided in lieu of said shafts and said tongue in order that the device may be drawn by machine power, if desired.

Figure 1:
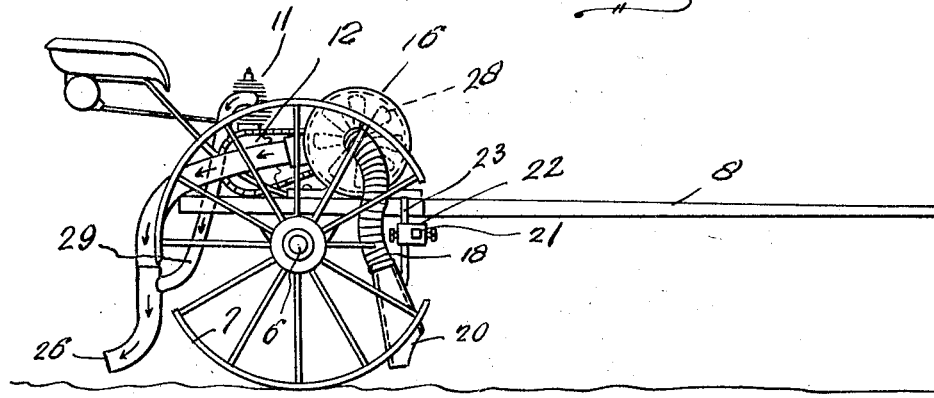
Figure 1 is a side elevation of my improved device.

Supported upon a cross bar 10 of the frame 5 and adjacent the rear side thereof is an internal combustion engine 11, the shaft of which is equipped with a relatively large sprocket gear 12 over which is trained a sprocket chain 13 that extends forwardly and is in turn trained over a relatively smaller sprocket gear 14 keyed to the center of a transverse shaft 15, the opposite ends of which are journaled within suction fan casings 16—16 supported upon the opposite side bars of the frame as clearly shown in both the Figures 1 and 2.

The outer sides of the casings 16 are provided with central inlet openings 17—17 within which are arranged certain ends of flexible pipe sections 18—18, the opposite ends of which are provided with flared metallic nozzles 19—19 that are adapted to be arranged directly over the rows of plants in a manner clearly shown in Figure 2.

Projecting outwardly from the sides of the frame 5, and at the forward edge thereof are horizontal bars 21—21 upon which are slidable collars 22—22, each of which is provided with a set screw in order that the same may be rigidly secured to the bars at desired positions thereon.

Projecting upwardly from each nozzle 20 is a rod 23 that is freely slidable within a vertical opening in the respective collar 22 and that is adapted to be rigidly secured within said opening at adjusted points by means of a set screw provided for this purpose. It will be readily apparent that the provision of these rods and collars permit the nozzles 20—20 to be raised or lowered according to the height of the plants from which the bugs are being extracted. Also, by moving the nozzle inwardly and outwardly with respect to the frame 5, the same may be positioned directly above said plant rows regardless of the distance therebetween.

Figure 3:
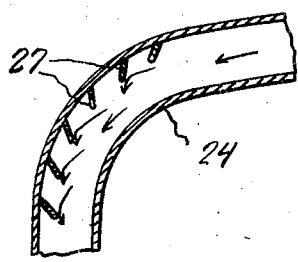
Figure 3 is an enlarged fragmentary section through one of the suction fan discharge pipes through which the bugs are directed.

Leading from the inner sides of the casings 16—16 and extending rearwardly of the frame are exhaust pipes 23—23 within which are arranged certain ends of rearwardly extending inwardly converging metallic pipes 24—24 that bend downwardly at their rear ends as clearly shown in Figures 1 and 3 and are arranged jointly within a manifold 25 from which terminates a discharge nozzle 26.

Formed within each discharge pipe 24 at the top thereof and at the point of bend as clearly shown in Figure 3 are spaced laterally projecting ribs 27 in order that the bugs which have been sucked from the plants by action of the suction fan 28 within the casings 16—16 will be forced rearwardly through said pipes and caused to strike against these ribs with great force resulting in the tilting of the same.

Leading from the combustion engine 7 is an exhaust pipe 29 that terminates within the manifold 25, the gases effectively killing any of the bugs that have escaped death after passing through the pipes 24—24.

It will thus be seen that I have provided a highly novel, simple, efficient, form of potato bug exterminator that is well adapted for all the purposes heretofore described, and even though I have set out in the foregoing specification and disclosed in the drawing the most practical mechanical elements combining to produce a machine of this character, it is nevertheless to be understood that minor changes may be made therein without effecting the spirit and scope of the appended claims.

Having thus described the invention, what I claim as new and desire to secure by Letters Patent is:—

1. In a potato bug exterminator of the character described, a wheel supported frame adapted to be drawn between rows of potato plants, an internal combustion engine supported upon said frame, suction fans arranged upon the frame at the opposite sides thereof, a driving connection between the fans and said engine, suction pipes leading from the fan casing, nozzles upon said pipes adapted to be arranged over the rows of plants, exhaust pipes leading from said fan casing and through which the bugs are adapted to be projected, spaced ribs within said pipes against which the bugs will be thrown in great force, a common discharge manifold for said pipes, and an exhaust pipe leading from said motor into said common manifold for subjecting the bugs to the action of the gases from the engine.

2. In a potato bug exterminator, a wheel supported frame, an internal combustion engine supported upon the frame, a suction fan arranged upon the frame including a casing and a fan wheel mounted therein, means whereby the fan will be rotated within the casing, a nozzle in communication with the inlet opening of the casing adapted to be arranged above a plant row, an exhaust pipe leading from the fan casing through which the bugs will be projected, and an exhaust pipe leading from the engine into said fan exhaust pipe for subjecting the bugs to the action of the gases from the engine.

3. In a potato bug exterminator, a wheel supported frame, an internal combustion engine supported upon the frame, a suction fan arranged upon the frame including a casing and a fan wheel mounted therein, means whereby the fan will be rotated within the casing, a nozzle in communication with the inlet opening of the casing adapted to be arranged above a plant row, an exhaust pipe leading from the fan casing through which the bugs will be projected, an exhaust pipe leading from the engine into said fan exhaust pipe for subjecting the bugs to the action of the gases from the engine, and means whereby the nozzle in communication with the inlet of the fan casing may be adjusted horizontally and vertically.

In testimony whereof I affix my signature.

DOMINIC F. SIKORSKI.